Aug. 13, 1946.                W. A. BALDWIN                 2,405,632
                                 AIR BRAKE
                          Filed March 23, 1945            2 Sheets-Sheet 2
Fig.3
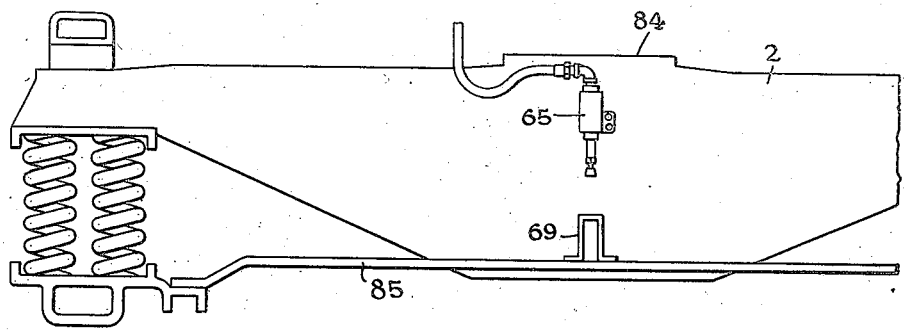
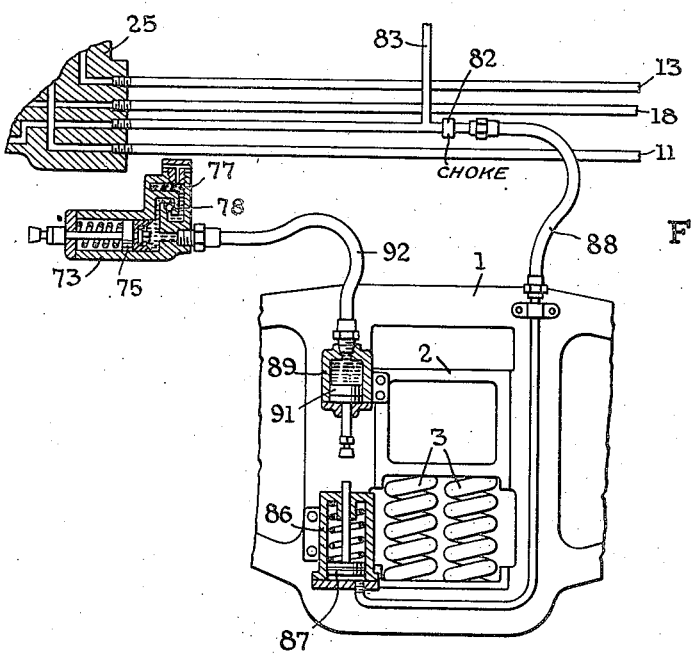
Fig.4
Inventor
Wayne A. Baldwin
By
Attorneys Patented Aug. 13, 1946

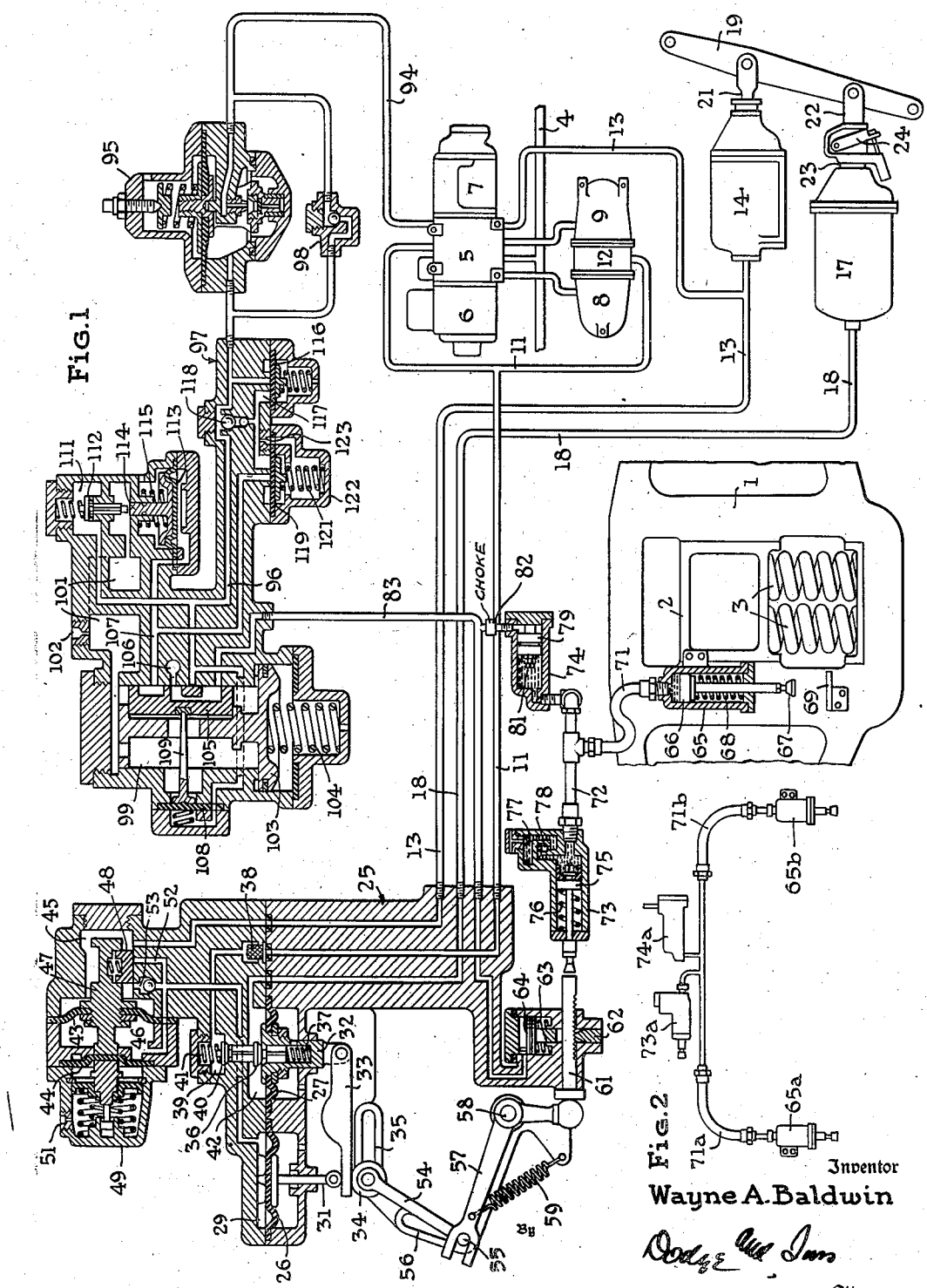

2,405,632

UNITED STATES PATENT OFFICE 2,405,632

AIR BRAKE

Wayne A. Baldwin, Watertown, N. Y., assignor to The New York Air Brake Company, a corporation of New Jersey Application March 23, 1945, Serial No. 584,411

10 Claims. (Cl. 303—22)

This invention relates to air-brakes of the variable load type, and the novelty resides in the pilot valve mechanism and in the load sensing mechanism controlled thereby.

The simplest way to determine the load on a car is to measure the depression of a load sustaining spring while the car is at rest. This has been proposed heretofore, but the load sensing mechanism was strictly mechanical and subject to wear. This led to inaccuracy and some uncertainty of response. Attempts to sense the depression of more than one spring would involve so much complication as to be unworkable under practical railroad conditions.

The present invention takes advantage of the simplicity and position averaging possibilities of a hydrostatic system to transmit an indication of the position of a spring borne element or an averaged indication of the simultaneous positions of several spring borne elements. Because flexible hose may be used as the hydraulic conduit the positions of spring borne elements on a truck or trucks may be indicated at a point on the car body.

The invention will be described as embodied in a system using a "light" brake cylinder which is put under pressure in all applications, and a load brake cylinder which is energized and latched to the foundation brake gear after the light brake cylinder has taken up the slack, but only in applications made when the car is loaded at least partially. The pressure developed in the load brake cylinder is proportional to that developed in the light brake cylinder, the ratio being determined by the adjustment of a variable ratio relay. This adjustment is determined by a strut cylinder or cylinders arranged to sense the spring depression.

The strut cylinder is rendered active only when the brake pipe pressure is restored after being completely dissipated. Thus the load is sensed only when the train is at rest. Control of the strut cylinder is exercised by a pilot valve mechanism which responds to initial restoration of brake pipe pressure.

Preferred embodiments will now be described by reference to the accompanying drawings, in which:

Fig. 1 is a diagram largely in section showing the equipment for a single car. In this view, the AB valve, the reservoirs and the brake cylinders are drawn in miniature to save space.

Fig. 2 is a view showing how two strut cylinders are connected to give an averaged indication.

Fig. 3 is a fragmentary view showing an alternative location of a strut cylinder.

Fig. 4 is a view similar to a portion of Fig. 1 and illustrating a modification.

The drawings show workable embodiments, but sections through valve mechanisms are diagrammatic to the extent that all ports are shown in a single plane. More compact commercial arrangements can be designed according to well known principles.

Figs. 1 and 4 show the system uncharged and under "no load" conditions.

Refer first to Fig. 1. Since the car truck and the AB brake valve are basic elements to which the invention is applied, these will be described first to develop the environment in which the invention will be used.

Pedestals of a conventional car truck are illustrated at 1 and the truck bolster at 2. Springs 3 support the bolster on the truck. The bolster is shown at its uppermost (unloaded) position from which load on the car will depress it relatively to the pedestals. Thus its depression downward from the illustrated position is a function of the load imposed on the car.

The brake pipe of an automatic air brake system extends from end to end of the car. Such brake pipes are connected from car to car by the usual angle cocks and coupled hose and charging and venting of the brake pipe are controlled by the usual engineers brake valve on the propelling unit. In the drawings only a fragment 4 of the brake pipe is illustrated, since its connections and control follow standard practice.

The brake pipe 4 is connected to the pipe bracket 5 on which are mounted the emergency portion 6 and service portion 7 of the AB brake valve. Piped individually to bracket 5 are the emergency reservoir 8 and the auxiliary reservoir 9. From bracket 5 a branched reservoir pipe 11 leads to a supply reservoir 12 and to the variable load mechanism. The supply reservoir 12 is not used with the regular AB brake valve, but is here provided to furnish air to the load cylinder. It is charged directly from brake pipe 4 through a check valve and a flow-resisting choke which are not shown but would desirably be mounted in bracket 5. It is known practice so to charge a supply reservoir where one is needed for any purpose. Consequently illustration of the path for charging the supply reservoir 12 is deemed unnecessary. The patent to Renshaw 2,155,226, April 18, 1939, shows a reservoir so charged.

The usual brake cylinder pipe 13 leads to the light brake cylinder 14 and has a branch leading to the variable load mechanism to be described.

The above named components except the parts 11 and 12 and the connections to the variable load mechanism are standard AB valve and freight car equipment. To these are added a load sensing mechanism, a load cylinder, and a variable ratio relay valve which controls the load cylinder.

The variable load mechanism controls admission and exhaust of motive air to and from the load brake cylinder 17 by way of load cylinder pipe and passage 18. The piston in light cylinder 14 operates lever 19 through the usual push-rod 21. Cylinder 14 always operates in advance of load cylinder 17 and so causes lever 19 to draw push-rod 22 outward relatively to the still retracted tubular piston rod 23 of cylinder 17. The distance so moved depends on the running slack. When piston rod 23 in load cylinder 17 starts outward, latch 24 is permitted to engage, and clutches piston rod 23 to push-rod 22. The clutch is of a type which disengages when piston rod 23 retreats to its full release (innermost) position.

This cylinder and latch arrangement is in daily use in light and load brakes, and consequently requires no detailed description. It is described on pages 30 and 31 and illustrated in Fig. 18 of the New York Air Brake Company Instruction Pamphlet 5062-2, entitled "The AB 10 Automatic Empty and Load Freight Car Brake Equipment."

The variable ratio relay mechanism is enclosed in a housing generally indicated at 25 and made up of castings having the necessary ports and passages hereinafter described. Pipes and passages which are in free communication with one another are designated by the same reference numeral in order to minimize the use of reference numerals on the drawings and simplify the description.

The relay proper comprises two movable abutments, shown as flexible diaphragms 26 and 27 of equal areas. These are clamped at their margins between separate portions of the housing 25 as shown. Each is subject on its lower face to atmospheric pressure. The chamber 29 above diaphragm 26 is subject at certain times to pressure developed in the light brake cylinder 14. It reacts downward on the enlarged head of the vertically guided thrust member 31. The diaphragm 27 carries at its center a ported hub 32. The lower end of the hub 32 is pinned to the right-hand end of a lever 33, the other end of which is in thrust engagement with a roller on the end of the thrust member 31. The lever 33 has a shiftable fulcrum which takes the form of a roller 34 whose journal is guided horizontally by a fixed guide slot 35. The port through hub 32 is controlled by a poppet type exhaust valve 36 which is biased in an opening direction (upward) by a coil compression spring 37 mounted in the hub beneath it.

The pipe 11, already described as connected to the supply reservoir 12, leads through a strainer 38 to a chamber 39 in the body 25. A poppet inlet valve 40 which opens toward the chamber 39 is biased in a closing direction by an overlying coil compression spring 41 as shown and has a downward extending pilot which is alined with and arranged to enter into thrust engagement with the exhaust valve 36. The parts are so proportioned that if the diaphragm 27 is forced upward, the effect is first to seat the exhaust valve 36 and then unseat the inlet or supply valve 40 admitting air from the supply reservoir 12 to the space 42 above the diaphragm 27. The space 42 is connected by the passage and communicating pipe 18 with the load cylinder 17.

During brake applications and after a definite pressure has been developed in the light cylinder 14, the pressure acting in the light cylinder 14 is permitted to act in the space 29 above the diaphragm 26. This action is timed and controlled by a pilot valve mechanism also housed in body 25.

The pilot valve mechanism comprises a large diaphragm 43 and a smaller diaphragm 44 which with portions of housing 25 define the chamber 45 to the right of the large diaphragm, and a chamber 46 which is in free communication with the chamber 29 above relay diaphragm 26. Chamber 45 is in free communication with light brake cylinder 14 by way of connection 13. Controlled by the two diaphragms jointly is a stem 47 which operates a small slide valve 48 in the chamber 45. The stem 47 is biased to the right by a pair of coil compression springs housed in the cap 49. A vent 51 is provided so that the left-hand face of the smaller diaphragm 44 is subject to atmospheric pressure.

The valve 48 controls a port 52 which is in free communication with the chamber 29, and consequently also with the space 46. It also controls a port 53 which communicates with the spaces 29 and 46, but in which is interposed a ball check valve clearly shown in the drawings, so arranged that flow can occur through this port toward but not away from chamber 45.

The strength of the loading springs in cap 49 is such that valve 48 will expose port 52 only after a pressure between 13 and 15 pounds gauge has been developed in the light brake cylinder 14. The springs are so chosen and the diaphragms are of such areas that the pressure differential above mentioned diminishes as the pressure in the cylinder 14 increases, and substantially disappears at the brake cylinder pressure attained in a full service application. It follows that during the start of an application, pressure builds up in the light brake cylinder 14 to a degree sufficient to take up the running slack, before the load cylinder 17 is rendered active. It is rendered active when the valve 48 starts to expose the port 52, thus putting the diaphragm 26 under pressure. This last statement assumes that the car is loaded, because as will be readily understood, the relay is inactive on an empty car.

The valve 48 has a very slight positive lap on the ports 52 and 53 so that during release the valve will expose port 53 just as or slightly after it closes port 52. The ball check valve renders port 53 ineffective during the development of an application but allows it to become effective during release. Thus the pressure in the relay diaphragm chamber 29 falls as the pressure in the light brake cylinder 14 falls.

The journal of the roller fulcrum 34 is pinned to a link 54 whose lower end has a pin 55 guided in an inclined slot 56. The bell-crank 57, which is fulcrumed at 58, has a forked end which engages the pin 55 and is biased in a counterclockwise direction by a coil tension spring 59. Thus the fulcrum roller 34 is spring biased to the position shown in the drawings, which is "no-load" position.

The mechanism so far described involves inventions made by others than the present applicant, and consequently no claim is here made to such mechanism.

The load sensing mechanism now about to be described determines the angular position of the bell-crank 57 and involves the most important aspect of the present invention.

The short arm of the bell-crank 57 is in thrust engagement with the head of a plunger 61, which is guided horizontally in a portion of the housing 25. Plunger 61 is notched as shown, and is held in adjusted position by a latch nose 62 which is biased toward engaging position by a coil compression spring 63 and may be released by admitting pressure to the cylinder space shown above the piston 64.

Mounted on the bolster 2 is a strut cylinder 65 in which is a piston 66 whose rod terminates in a strut head 67. The piston is urged to its upward (inactive) position by a coil compression spring 68. A stop 69 is fixed on the truck frame 1. When the car is unloaded, as indicated in Figure 1, the extreme downward motion of piston 66 will carry the strut head 67 just into contact with the stop 69. If the car is loaded the bolster 2 will be in a lower position and consequently the possible travel of the piston 66 is decreased by the amount of depression of the bolster 2.

The upper end of the strut cylinder 65 is in communication by way of a hose 71 and pipe connection 72 with two other cylinders 73 and 74. The cylinder 73 contains a piston 75 having a rod which is alined with the plunger 61 and thus may operate to force the plunger 61 to the left. The piston 75 is biased inward (to the right in the drawings) by a coil compression spring 76. If the piston 75 is forced to the left when the latch 62 is disengaged the effect will be to turn the bell-crank 57 clockwise against the biasing stress of spring 59.

The reservoir 77, with feeding check valve 78, supplies hydraulic liquid (oil) to the space to the right of piston 75 and all connected spaces, as will be explained. The purpose is to keep the hydraulic system oil-filled when inactive under "no-load" conditions so that its action will be precise when it occurs.

A free piston 79 is slidable in the cylinder 74, and the oil-feeding check valve maintains the space to the left of piston 77, the space above the strut piston 66, the space to the right of the adjusting piston 75, the pipe 72 and hose 71 completely filled with oil. The piston 79 carries an adjustable stop 81, and this is so adjusted that the complete displacement of piston 79 in cylinder 74 will displace piston 66 far enough to cause strut head 67 to engage stop 69 under "no-load" conditions. Thus, if piston 79 is actuated under "no-load" conditions piston 66 will move full stroke and piston 75 will not be affected. Under load conditions the motion of piston 66 is limited and consequently the full stroke motion of piston 79 will then produce motion of the adjusting piston 75. Such motion will be a function of the extent to which the motion of strut piston 66 has been reduced.

The piston 79 is operated by air under pressure admitted through a choke 82 from a connection 83 controlled as will be later described. The connection 83 also leads to the cylinder space above the latch piston 64. The effect of the choke 82 is to assure release of the latch by rising air pressure before the piston 79 starts to the left, and re-engagement of the latch when the air pressure falls, before the piston 79 moves to the right.

There are several alternative arrangements of the strut cylinder 65 and they will now be described.

In Figure 1 there is only one strut cylinder and this is shown located at the side of one truck.

Most railroad cars have two trucks and if the car were loaded at one end, and not loaded at the other the load indication of the strut mechanism would be incorrect. The same might be true if the car were loaded more heavily on one side than on the other.

The latter condition can be avoided by locating the strut cylinder as shown in Figure 3. In Figure 3 the strut cylinder 65 is shown located on the bolster 2 adjacent the center bearing 84, and the stop 69 is shown mounted on a bridge piece 85. Since this involves merely a relocation of parts shown in Figure 1, the same reference numerals are used. No change of function is involved.

To sense the load at any two points on the car two strut cylinders may be used as shown in Figure 2. This view shows a strut cylinder 65a which may be mounted, as shown in Figure 3, on one of the two trucks and another strut cylinder 65b similarly mounted on the other of two trucks. Both cylinders are connected by hose 71a, 71b with a single adjusting cylinder 73a identical with the cylinder 73 shown in Figure 1, and a single displacing cylinder 74a which is identical with the cylinder 74 except that it is larger. It might be longer or of greater diameter or both. The essential point is that the piston corresponding to the piston 79 must have approximately twice the displacement of piston 79 of Figure 1, so that the two strut cylinders shown in Figure 2 can be moved through their necessary stroke.

An important characteristic of the arrangements shown in Figures 1, 2 and 3 is that the only moving part which is mounted on the truck is the strut cylinder, or the strut cylinders in cases where more than one be used. All other mechanisms are mounted on the car underframe.

To indicate the versatility of the hydraulic load feeler mechanism another arrangement is shown in Figure 4. This requires two hose connections to the truck and involves the use of two truck mounted cylinders. In this view parts which are identical with parts shown in Figure 1 are given the same numerals as in Figure 1.

Mounted on the truck frame 1 is a cylinder 86 having a piston 87 which is forced downward by a coil compression spring as shown and which may be forced upward by air admitted from connection 83 through choke 82. The piston 87 is capable of limited motion and moves full stroke when it moves. The air connection is by way of a hose 88 fed by choke 82.

Mounted on the bolster 2 and axially alined with the cylinder 86 is a cylinder 89 in which is mounted a piston 91 having a downward-projecting rod. The space in cylinder 89 above piston 91 is connected by a hose 92 with the right-hand end of cylinder 73. Hose 92 and the two cylinder spaces with which it communicates are oil-filled.

If the piston 87 is forced up full stroke under "no-load" conditions it will just reach the rod of piston 91. However, if the bolster 2 is downwardly displaced by load, the piston 91 will be forced upward and the piston 75 will be forced to the left a corresponding amount.

The arrangement shown in Figure 4 is functionally similar to the arrangement shown in Figure 1, but it has the possible disadvantage that two of the cylinder units are truck-mounted and that two hose connections to the truck are required. The operative characteristics are basically similar.

An extension 94 of the brake pipe 4 leads through a reducing valve 95 to passage 96 in the body 97 of a pilot valve mechanism. Back-flow past the reducing valve is afforded by a by-pass check valve 98. The reducing valve 95 is of known construction and its sole purpose is to reduce the pressure of supply to the pilot valve to a value so low as not to be affected by service reductions of brake pipe pressure. For ordinary purposes reduction to 35 pounds gauge attains the desired result, and will be assumed.

In the body is a timing valve chamber 99 with communicating timing volume 101 bled to atmosphere by timing choke 102. A piston 103 works in a cylindrical extension of chamber 99 and is biased upward by coil compression spring 104. The lower face of the piston is subject to atmospheric pressure. The piston has a guiding stem and actuates a slide valve 105.

Passages 83 and 96 terminate in this seat as do an exhaust port 106 and pilot port 107. Passage 96 has an extension which loads diaphragm 108 to hold valve 105 to its seat through an interposed strut 109.

In its normal upper position (shown in Figure 1) valve 105 blanks port 96 and pilot port 107 and vents connection 83. When moved to its lower position the valve vents pilot port 107 and connects passage 96 to connection 83. Cavities to establish such connections are clearly illustrated in the drawings. They are formed in the face of valve 105.

Passage 96 leads to chamber 111. A poppet valve 112 opening toward chamber 111 controls flow thence to timing chamber 101. A diaphragm 113 subject to pressure in pilot port 107 reacts upward on stem 114 which is normally held downward by spring 115. When pilot port 107 is under pressure valve 112 is unseated and chambers 101 and 99 are charged, say to 35 pounds gauge.

A limiting valve 116 of the diaphragm type admits air from port 96 to space 117. It stays closed until pressure in passage 96 reaches say 20 pounds gauge, and remains open until pressure falls substantially below this value. This follows from the fact that opening of the valve increases the area of the diaphragm which is exposed to pressure. Free return flow by-passing this valve is assured by the ball check valve 118.

An impulse valve is provided to permit flow from space 117 to pilot port 107 to occur for a timed period. A combined diaphragm and valve 119 is subject to pressure in space 117 acting in an opening direction. The diaphragm is biased to close against the end of pilot port 107 by spring 121. The space behind diaphragm 119 is enclosed by a cap 122 and communicates with space 117 via choke 123. When pressure is developed in space 117 diaphragm 119 is forced down, opening pilot port 107, but flow through choke 123 soon develops enough pressure in cap 122 to cause the diaphragm to move up and close pilot port 107.

*Operation—Figure 1*

When a car is not connected in a train, the brake pipe is completely vented. For present purposes it is immaterial whether at that time the brakes are applied or released. The parts of the variable load mechanism would be in the position shown except that the roller 34 would not necessarily be in "no-load" position.

Assume now that the car is connected in a train and that the engineer starts to charge the system. Pressure would rise in the brake pipe 4, and the passage 96 would be charged but never above the 35 pound limit imposed by the reducing valve 95. Nothing would happen until limiting valve 116 opens. This can be assumed to occur at 20 pounds gauge. At such time the space 111 would also be under pressure. The piston 103 would be in its uppermost position because of the action of the vent 102.

As soon as the limiting valve 116 opens the impulse valve 119 will open and subject the pilot port 107 to pressure. The valve 119 will remain open for a definite period determined by the capacity of the choke 123 and the volume of the cap 122. This period is long enough to assure charging of the timing chamber 101 and the valve chamber 99. This charging occurs as a consequence of the development of pressure in the pilot port 107, and beneath the diaphragm 113 which moves upward opening valve 112.

Charging of the valve chamber 99 causes the piston 103 to move to its lowermost position, in which position valve 105 vents pilot port 107 and connects passage 83 with passage 96. In consequence, charging valve 112 closes. Although brake pipe pressure will continue to rise, port 107 cannot be recharged because timing valve 119 cannot reopen. Piston 103 remains in its lowermost position charging connection 83 until the choke 102 has bled away the pressure in the timing chamber 101, and valve chamber 99. At such time the piston 3 will rise and vent the connection 83.

Hence, during charging of the brake pipe, connection 83 is put under pressure and then vented, and thereafter remains vented until another emergency application occurs.

When the connection 83 is put under pressure the latch 62 is released and shortly thereafter the piston 79 moves full stroke to the left. The depression of bolster 2 determines how far piston 66 will move, and if this motion is less than full stroke piston 25 will be moved to the left. Thus the plunger 61 will be forced to the left, turning bell-crank 57 clockwise and positioning the roller fulcrum 34 at some point in guide 35 appropriate to the load on the car.

When pressure in connection 83 is dissipated, the first effect is to cause the latch 62 to engage, and the next effect is to permit the springs 76 and 68 to force the pistons 75 and 66 to their inactive positions. This entails return of piston 79 to its inactive position.

The structure shown in Figure 2 operates similarly, it being understood that both strut cylinders 65a and 65b become active at the same time and retreat to inactive position at the same time.

In the structure of Figure 4 the piston 87, which moves outward when the connection 83 is placed under pressure would retreat to the position shown in the drawings when that pressure is dissipated. If bolster 2 is depressed from "no-load" position the piston 91 would be moved in a commensurate degree causing the piston 75 to effect an adjustment of the variable load relay.

It is unnecessary to trace the operation of the variable load relay except to remark that the development of pressure in the space 29 causes development of pressure in the space 42 until these two pressures balance in a ratio determined by the position of the fulcrum 34. The pressure in the space 42 is the same as the pressure developed in the load brake cylinder 17.

Several embodiments of the invention have been described, and variants within the broad scope of the invention can be worked out in a number of specifically different forms. Those described are intended to be illustrative, and no

What is claimed is:

1. In a variable-load brake for a vehicle, the combination of an air-brake unit; spring borne vehicle load-sustaining means; a variable ratio relay controlling the intensity of brake applications made by said air-brake unit and including a member shiftable through an adjusting range to vary the relay ratio; means serving to bias said member toward one extreme of its motion; an expansible chamber hydraulic motor capable of moving said member through said range in opposition to said bias; a pneumatic expansible chamber motor which when energized moves through a definite range; and a hydraulic motion transmitting connection from the pneumatic to the hydraulic motor, including an expansible chamber unit whose effective volume is controlled by depression of said load-sustaining means, whereby the response of the hydraulic motor to motion of the pneumatic motor is modified according to load.

2. The combination defined in claim 1 in which there are a plurality of spring borne load-sustaining means and a plurality of expansible chambers whose volumes are respectively controlled thereby, all said chambers being included in the hydraulic motion transmitting connection.

3. In a variable-load brake for a vehicle, the combination of an air-brake unit; spring borne vehicle load-sustaining means; a variable ratio relay controlling the intensity of brake applications made by said air-brake unit and including a member shiftable through an adjusting range to vary the relay ratio; means serving to bias said member toward one extreme of its motion; an expansible chamber hydraulic motor capable of moving said member through said range in opposition to said bias; a pneumatic expansible chamber motor which when energized moves through a definite range; a hydraulic motion transmitting connection from the pneumatic to the hydraulic motor, including an expansible chamber unit whose effective volume is controlled by depression of said load-sustaining means, whereby the response of the hydraulic motor to motion of the pneumatic motor is modified according to load; a pneumatically controlled latch for said adjustable member; and means for releasing the latch then energizing the pneumatic motor, then engaging the latch and then venting the pneumatic motor, all as an incident to pneumatically charging said brake unit.

4. In a variable-load brake for a vehicle, the combination of an air-brake unit; spring borne vehicle load-sustaining means; a variable ratio relay controlling the intensity of brake applications made by said air-brake unit and including a member shiftable through an adjusting range to vary the relay ratio; means serving to bias said member toward low intensity adjustment; an expansible chamber hydraulic motor capable of moving said member through said range in opposition to said bias; a pneumatic expansible chamber motor which when energized moves through a definite range; and a hydraulic motion transmitting connection from the pneumatic to the hydraulic motor, including an expansible chamber unit whose effective volume is controlled by depression of said load-sustaining means, whereby the response of the hydraulic motor to motion of the pneumatic motor is increased with increase in load.

5. In a variable-load brake for a vehicle, the combination of an air-brake unit; spring borne vehicle load-sustaining means; a variable ratio relay controlling the intensity of brake applications made by said air-brake unit and including a member shiftable through an adjusting range to vary the relay ratio; means serving to bias said member toward low intensity adjustment; an expansible chamber hydraulic motor capable of moving said member through said range in opposition to said bias; a pneumatic expansible chamber motor which when energized moves through a definite range; and a hydraulic motion transmitting connection from the pneumatic to the hydraulic motor, including an expansible chamber unit whose effective volume is controlled by depression of said load-sustaining means, whereby the response of the hydraulic motor to motion of the pneumatic motor is increased with increase in load; a pneumatically controlled latch for said adjustable member; and means for releasing the latch then energizing the pneumatic motor, then engaging the latch and then venting the pneumatic motor, all as an incident to pneumatically charging said brake unit.

6. In a variable-load brake for a vehicle, the combination of an air-brake unit; spring borne vehicle load-sustaining means; a variable ratio relay controlling the intensity of brake applications made by said air-brake unit and including a member shiftable through an adjusting range to vary the relay ratio; means serving to bias said member toward one extreme of its motion; an expansible chamber hydraulic motor capable of moving said member through said range in opposition to said bias; a pneumatic expansible chamber motor which when energized moves through a definite range; and a hydraulic motion transmitting connection from the pneumatic to the hydraulic motor, including a displacing plunger operated by the pneumatic motor and a variable volume device whose volume is controlled by displacement of said spring borne means, the parts being so related that enlargement of said chamber neutralizes at least in part the displacing action of said plunger.

7. In a variable-load brake for a vehicle, the combination of an air-brake unit; spring borne vehicle load-sustaining means; a variable ratio relay controlling the intensity of brake applications made by said air-valve unit and including a member shiftable through an adjusting range to vary the relay ratio; means serving to bias said member toward one extreme of its motion; an expansible chamber hydraulic motor capable of moving said member through said range in opposition to said bias; a pneumatic expansible chamber motor which when energized moves through a definite range; and a hydraulic motion transmitting connection from the pneumatic to the hydraulic motor, including a displacing plunger operated by the pneumatic motor and a normally collapsed variable volume device, whose distention is variably limited according to the degree of depression of said spring borne means, said plunger acting to develop pressure in said chamber and in said hydraulic motor.

8. In a variable-load brake for a vehicle, the combination of an air-brake unit; spring borne vehicle load-sustaining means; a variable ratio relay controlling the intensity of brake applications made by said air-brake unit and including a member shiftable through an adjusting range to vary the relay ratio; means serving to bias said member toward one extreme of its motion;

an expansible chamber hydraulic motor capable of moving said member through said range in opposition to said bias; a pneumatic expansible chamber motor which when energized moves through a definite range; a hydraulic motion transmitting connection from the pneumatic to the hydraulic motor, including a displacing plunger operated by the pneumatic motor and a normally collapsed variable volume device, whose distention is variably limited according to the degree of depression of said spring borne means, said plunger acting to develop pressure in said chamber and in said hydraulic motor; a pneumatically controlled latch for said adjustable member; and means for releasing the latch then energizing the pneumatic motor, then engaging the latch and then venting the pneumatic motor, all as an incident to pneumatically charging said brake unit.

9. In a variable-load brake the combination of a brake pipe; brake controlling valve means including an adjustable ratio relay; load controlled relay adjusting means of a type which functions when temporarily subjected to pressure; a valve having a timing chamber with restricted vent, said valve serving to subject said adjusting means to pressure when the timing chamber is charged and vent the adjusting means at all other times; a pressure operated pilot valve operable to charge said chamber from the brake pipe; and an impulse valve responsive to rising brake pipe pressure to deliver operating pressure for a timed interval to said pilot valve.

10. In a variable-load brake the combination of a brake pipe; brake controlling valve means including an adjustable ratio relay; load controlled relay adjusting means of a type which functions when temporarily subjected to pressure; a valve having a timing chamber with restricted vent, said valve serving to subject said adjusting means to pressure when the timing chamber is charged and vent the adjusting means at all other times; a pressure operated pilot valve operable to charge said chamber from the brake pipe; and an impulse valve responsive to rising brake pipe pressure to deliver operating pressure for a timed interval to said pilot valve; a pressure reducing valve for protecting said impulse valve from fluctuations of brake pipe pressure occuring above a chosen pressure; and a by-pass check valve arranged to permit back flow to the brake pipe past said reducing valve.

WAYNE A. BALDWIN.